UNITED STATES PATENT OFFICE.

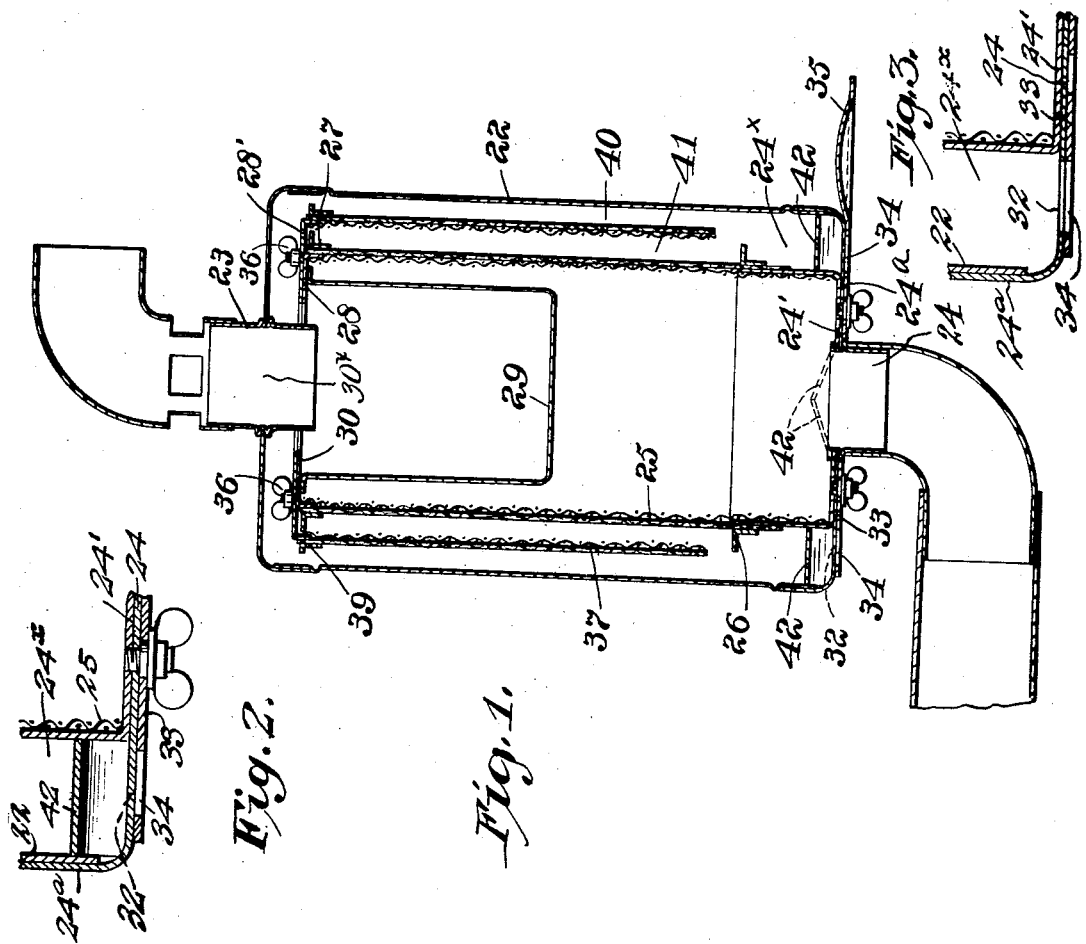

FREDERICK STRATTNER OREM, OF BALTIMORE, MARYLAND.

AIR-STRAINER.

1,337,564.    Specification of Letters Patent.    Patented Apr. 20, 1920.

Application filed December 14, 1917. Serial No. 207,190.

*To all whom it may concern:*

Be it known that I, FREDERICK STRATTNER OREM, a citizen of the United States, and resident of Baltimore, Maryland, have invented certain new and useful Improvements in Air-Strainers, of which the following is a specification.

The object of my invention is to provide means whereby the air on its way to a carbureter will be made to take a circuitous course and pass through filtering material which will remove the dust and dirt therefrom, the larger particles of dust being collected in a receptacle on its way to the filtering material and a receptacle being provided to receive the dust which is caught by the filtering material and arrested in its onward passage.

The invention consists in the features and combination and arrangement of parts hereinafter described and particularly pointed out in the claims.

In the drawing Figure 1 represents a central vertical sectional view of the air filter.

Fig. 2 is a detail sectional view of means for clearing accumulations from the device, and Fig. 3 is a view similar to Fig. 2 with the parts in another position.

This air filter is a development of that disclosed in my Patent Number 1,215,974, February 13th, 1917, this filter comprising a casing 22 having upper and lower heads 23, and 24 respectively. The lower head supports a member 25 adapted to permit the passage of air and at the same time adapted to support the filtering material.

The member 25 is of wire mesh. The filtering material is held in place by a ring 26 at its lower end and at its other end a ring 27 clamps it to an inner head 28, which is held on the end of the wire mesh support. This head has a central cup-shaped member 29 with the flange or upper plate 30 of the inner head reaching thereover, the function of this cup being to intercept any particles of dirt, or dust which enters through the opening in the outer head of the casing and forms a collector therefor. The current of air entering the device through the inlet nozzle 30× will impinge upon this cup-shaped member and thence its course will be changed to flow laterally over the outer side of the inner head and in between the outer casing and the cylindrical body of filtering material, the suction of the engine drawing this air through the filtering material and the wire mesh form of support, the air finally reaching the space within the filtering material and passing thence through the opening in the lower outer head of the casing and by any suitable connection, as the flexible one indicated at 31 to a carbureter, it being understood that my air filter is adapted to take out the dust from the air fed to the carbureter of an automobile engine.

It will be understood that the member 24′ has an upstanding flange to which the filtering material is connected and the dust collecting receptacle of annular form is between this flange and the outer flange 24ª and when the lower head is separated from the casing this annular dust collecting receptacle is exposed as well as the upper cup and the outside of the filter material, so that all these parts can be cleaned.

The nozzle 30× extends across the space between the upper head of the casing and the open top of the cup to direct the air with certainty into the bottom of the cup.

The inlet and outlet are coaxially arranged and this is true also of the filter material or inner member, the casing, the upper cup and the annular dust receiving chamber at the bottom of the apparatus.

The air first passes into the upper cup, then reverses its direction and passes out over the top of the cup, over the head of the inner filtering member, thence down between the casing and the filtering member, and this flow of air takes place at all points around the inner filter securing an even distribution of the dust to all parts of the filter surface and thus utilizing the filter material to a maximum degree. This effect is also due to the central location of the outlet which draws equally from all points within the filter cylinder.

The lower head 24 is made up of two portions, that marked 24′, being the inner portion and having the filter attached thereto as above described, the outer portion being that which joins the wall 22 of the casing, and between these two portions there is a space 24× in which larger particles of dirt which are not collected in the cup 29 may be caught and retained. For cleaning this space 24×, which will be necessary only at infrequent intervals I provide openings in the lower head at 32, and on the bottom of the head I mount a rotary plate 33 having ports 34 which by grasping handle 35 and turning the plate may be made to register with the openings in the bottom head for the discharge of the dirt.

The upper inner head 28 supports another head 28' secured thereto in any suitable manner, as by the wing nuts 36, and this supplemental head supports a baffle cylinder 37, which is preferably made up of a wire screen covered with the filtering cloth or felt, the latter being held in place by the ring 39. This baffle cylinder extends only part way down within the casing and it leaves space 40 on its outer side communicating with the inlet and a space 41 on its inner side between it and the main filtering cylinder, so that the air will be compelled to pass down the outside of this baffle and up through the space 41, and thence in through the main filtering material before it reaches the outlet, and thus the heavier particles will be compelled to pass downwardly and will be deposited in the space at the bottom head, as above set forth.

Some of the air may be drawn through the baffle and strained.

The filtering cylinder and baffle, together with the upper cup may be removed from the casing by removing the lower head and the baffle may be removed from the filtering cylinder by turning the wing nuts. These wing nuts may be fastened by solder to prevent accidental turning.

The baffle affords protection against the flow of dirt and air directly to the main filtering cylinder.

The filter can be made in different shapes to suit conditions in applying to different motors. It is preferred, however, to have it cylindrical for ordinary conditions.

The overhanging flange 30 acts as a supplemental baffle to catch dirt which tends to leave the upper cup or receptacle.

At the bottom of the outer casing and in the space 24[x] I place inclined guides or deflectors 42 which at their upper ends join each other forming an apex, and the lower ends of these inclined pieces reach to the holes in the bottom of the lower head, so as to direct the collected dust to these openings for discharge.

What I claim is:

1. An air filter for carbureters comprising a casing having a head at one end with an inwardly projecting inlet nozzle and a head at the other end with an outlet opening axially in line with the inlet nozzle, a perforated inner member supported by the head at the outlet end of the casing and terminating at its free end short of the inlet head of the casing and spaced apart from the casing, leaving a space between itself and the casing all around the same, said inner member having a head at its free end, a cup-shaped member carried by said head and projecting within the inner member and arranged with its open end opposite the inlet nozzle of the casing, said inlet nozzle projecting across the space between the head of the casing and to the open end of the cup-shaped member to direct the air into said cup-shaped member centrally thereof, said nozzle being of smaller diameter than the cup-shaped member to leave a space between it and the wall of said cup-shaped member, filtering material supported by the inner member, said inner member extending about the discharge opening and between it and the wall of the casing, whereby air coming in through the inlet nozzle will pass into the cup, thence over the edge of the cup to the space between the filtering material and the casing and thence inwardly through the filter material to the interior of the inner supporting member and thence through the outlet, substantially as described.

2. In connection with the features of claim 1 a flange at the top of the cup-shaped member extending inwardly over the space within the cup toward the nozzle to act as a baffle plate to catch larger particles of dust within the cup, substantially as described.

3. An air filter for carbureters comprising a casing having a head at one end with an inwardly projecting inlet nozzle and a head at the other end with an outlet opening axially in line with the inlet nozzle, a perforated inner member supported by the head at the outlet end of the casing and terminating at its free end short of the inlet head of the casing and spaced apart from the casing, leaving a space between itself and the casing all around the same, said inner member having a head at its free end, a cup-shaped member carried by said head and projecting within the inner member and arranged with its open end opposite the inlet nozzle of the casing, said inlet nozzle projecting across the space between the head of the casing and to the open end of the cup-shaped member to direct the air into said cup shaped member centrally thereof, said nozzle being of smaller diameter than the cup-shaped member to leave a space between it and the wall of said cup-shaped member, filtering material supported by the inner member, said inner member extending about the discharge opening and between it and the wall of the casing, whereby air coming in through the inlet nozzle will pass into the cup, thence over the edge of the cup to the space between the filtering material and the casing and thence inwardly through the filtered material to the interior of the inner supporting member and thence through the outlet, and a baffle member suspended from the head of the inner member and depending in the space between the inner member and the surrounding casing, substantially as described.

4. In combination in an air filter, a casing having a head with a centrally disposed inlet nozzle for the air, a head at the opposite end of the casing having an outlet opening axially in line with the inlet nozzle, said head having an upstanding flange to engage the wall of the casing and having an inner annular wall upstanding from said head and spaced apart from said flange to form a dust collecting receptacle between them, an inner member supported by the inner upstanding flange and terminating short of the inlet head and having a space surrounding it between itself and the wall of the casing, a cup supported by the free end of the inner member with its open end in line with the inlet nozzle, but with a space between itself and said nozzle and filtering material supported by the inner member, whereby the air passing through the inlet nozzle is directed into the cup, thence over the top of the cup to the space between the inner member and the casing, thence through the filtering material to the interior of the inner member and thence to the central outlet, the dust being collected in the said cup and in the receptacle between the flange of the outlet head and the inner flange supported by said head, substantially as described.

5. In combination a casing having heads with an air inlet at one head and an outlet at its other head coaxially arranged in respect to each other and the casing, an upstanding flange coaxially arranged in respect to the casing and surrounding the outlet, a perforated cylinder supported by said flange, filtering material held on the outer side of the said cylinder, a head on the free end of said cylinder spaced apart from the head of the casing, a cup member coaxially arranged in respect to the casing and perforated cylinder and mounted on the head of the latter with its open end opposite the inlet, a baffle cylinder coaxially arranged with and between the walls of the casing, and said perforated cylinder, the lower head having openings for clearing the space between the annular internal flange and the wall of the casing and means for controlling said openings.

6. In combination a casing having an air inlet arranged centrally in one head and an air outlet arranged axially in line therewith in the other head, said last mentioned head having an upstanding imperforate wall surrounding the inlet opening and between it and the side wall of the casing, a hollow perforated member extending above said flange and terminating short of the head at the inlet end of the casing and with a space between it and the casing all around the same, said inner hollow member having a head, spaced apart from the head of the casing at the said inlet end thereof, a cup supported by said head with its open end opposite the inlet opening, and filtering material supported by said perforated inner hollow member, the said outlet communicating with the interior of the hollow member and causing the air to be drawn in through the inlet, into the cup, thence over the top of the head of the inner hollow member, through the space between said hollow member and the casing, and through the filtering material from all sides thereof into the interior of the hollow member, the dust collecting in the cup and in the annular space between the said inner flange and the wall of the casing substantially as described.

In testimony whereof I affix my signature.

FREDERICK STRATTNER OREM.